Dec. 29, 1925. 1,567,189
O. H. REBENSCHIED ET AL
SAFETY FIRST VISION PROTECTING SHIELD FOR ENGINEERS, ATTACHABLE TO THE
SIDE WINDOW OF A LOCOMOTIVE
Filed March 2, 1925
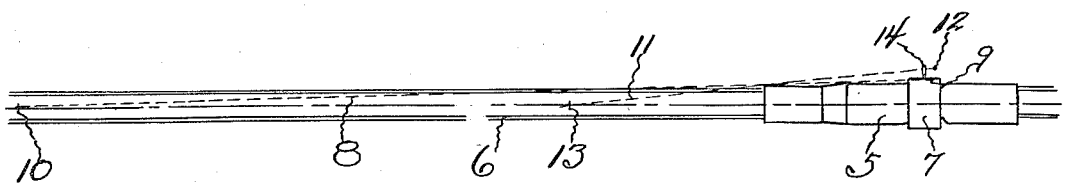
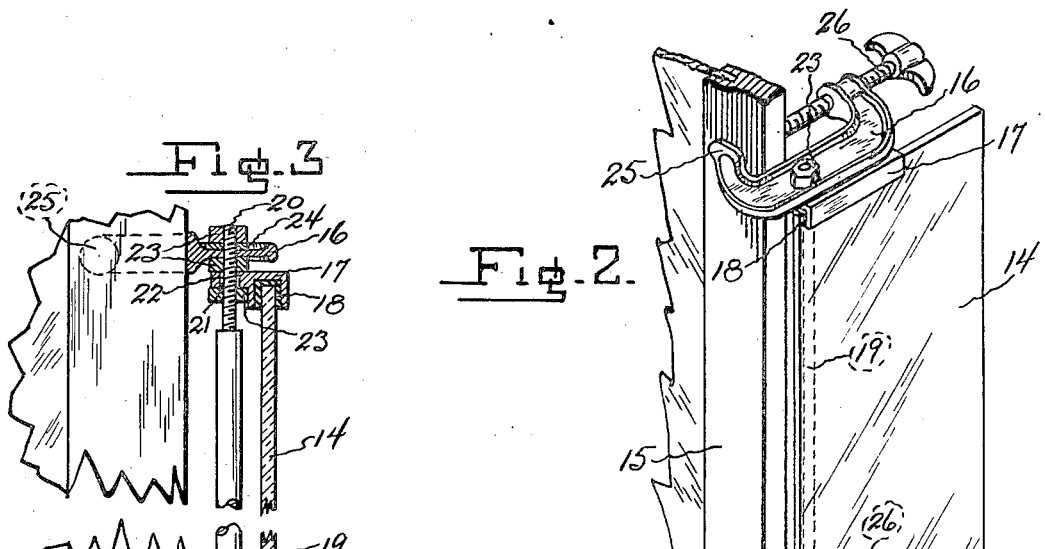
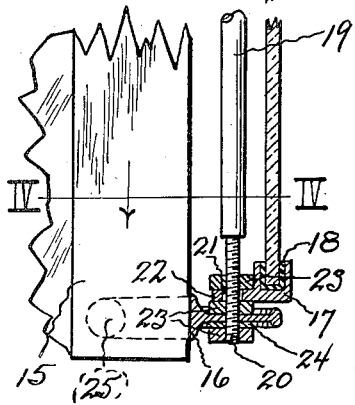
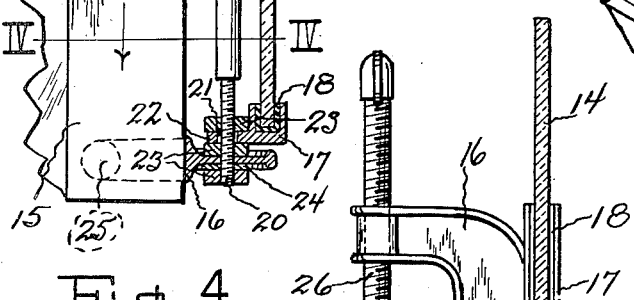
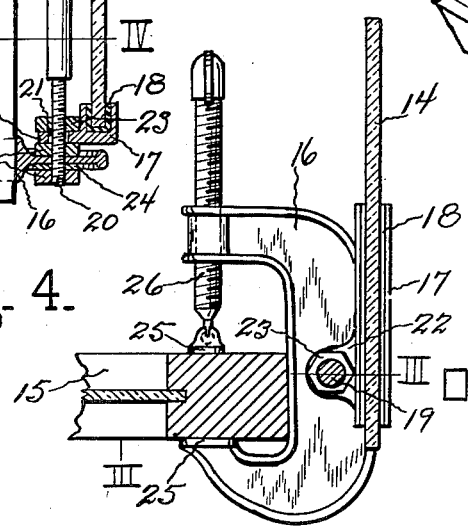
INVENTORS
Oscar H. Rebenschied
BY AND Charles G. Mee
ATTORNEY.

Patented Dec. 29, 1925.

1,567,189

UNITED STATES PATENT OFFICE.

OSCAR H. REBENSCHIED, OF KANSAS CITY, KANSAS, AND CHARLES G. MEE, OF LOS ANGELES, CALIFORNIA.

SAFETY-FIRST VISION-PROTECTING SHIELD FOR ENGINEERS, ATTACHABLE TO THE SIDE WINDOW OF A LOCOMOTIVE.

Application filed March 2, 1925. Serial No. 12,545.

*To all whom it may concern:*

Be it known that we, OSCAR H. REBENSCHIED and CHARLES G. MEE, citizens of the United States, and residing, respectively, at Kansas City, in the county of Wyandotte and State of Kansas, and Los Angeles, in the county of Los Angeles and State of California, have invented certain new and useful Improvements in Safety-First Vision-Protecting Shield for Engineers, Attachable to the Side Window of a Locomotive, of which the following is a complete specification.

This invention relates to a vision protecting device to be used by engineers, firemen, and all other trainmen whose duty it is to watch ahead of a train of moving cars.

The primary object of the present invention is the provision of a safety first, vision protecting shield, particularly adapted for use by locomotive engineers who drive the larger and faster passenger engines.

It is well known by all engineers that a view of the track ahead extending as close to the front of the engine as possible is highly desirable. The ordinary front window of an engine cab is exceedingly close to the boiler and is very narrow. Looking at the track ahead through this window gives a view of the same a considerable distance ahead, but never permits the engineer to see the track comparatively close to the engine.

There has never been a device made or attached to any part of the engine cab which protects the eyes and face of the engineer when he leans out of the side window, and it is the object of this invention to provide an attachable shield, which will function as a vision protector when the cab side window is open and the engineer is leaning out to view the track ahead.

A further object of the present invention is the provision of a novel means for attaching the vision protecting shield whereby the same may be easily removed and attached to other parts of the engine cab, or to an entirely different cab.

A still further object of this invention is the contemplation of a simple structure, of few parts, for embodying the same. Such invention has been illustrated, in its preferred form, in the accompanying drawing, in which:

Figure 1 is a diagrammatical view of a locomotive and a stretch of track.

Fig. 2 is a perspective view of the vision protecting shield showing the same attached to the slidable side window of a locomotive cab.

Fig. 3 is an enlarged vertical section of the invention, taken along line III—III of Fig. 4; and, Fig. 4 is a cross section of the same taken on line IV—IV of Fig. 3.

In the drawings, wherein similar reference characters refer to like parts throughout the several views, 5 designates an ordinary locomotive traveling over a stretch of track 6, with the attachable vision protecting shield carried by the right side window of cab 7. To more fully demonstrate the advantage of such an attachment, the line of vision 8 has been extended through the well known cab front window, from the normal position of the engineer's eyes shown at point 9, to the point 10 where the center of the track 6 ahead is first seen. Advantage of the use of the present invention may now be clearly comprehended by following the line of vision 11 from point 12, behind the shield, to point 13 where the center of track 6 is first seen. The advantage of viewing the track 6 between points 10 and 13 is obvious, and the advisability of using such a vision protecting shield need not be further mentioned.

Referring at this time to the preferred way of constructing the invention, as shown in Figs. 2, 3 and 4, the same may be constructed to present a transparent shield 14, which is made any desired size and shape, having in mind, of course, the clearance distance allowed beyond the sides of cab 9. Shield 14 is here illustrated as being a sheet of heavy plate glass, rigidly held in position to the longitudinally slidable engine cab window 15 by a pair of clamps 16, secured to the upper and lower ends respectively of the shield by a channel 17, which is lined with a resilient substance, such as rubber, felt or tape, 18 to prevent the breaking of shield 14.

In providing shield supports such as this, it is not necessary to weaken the same by drilling the fragile glass at any point. The channels are at the extreme upper and lower edges of the transparent shield 14, and do not obstruct the view in any way. Channels 17 face each other and grip the shield 14 therebetween, and may, though not necessarily, extend for but a portion of the width of shield 14. The proportional length shown in the drawing is sufficient to maintain the shield 14 in the desired position at right angles to the window 15. Through the use of clamps 16, the shield 14 may be vertically adjusted to any desired position.

To properly space clamps 16, and secure the same to channels 17, a rod or the like 19 of any suitable material and size is provided, which has its ends screw-threaded as at 20, to pass through opening 21 provided in a lug 22 formed integrally with one wall of each channel 17. Nuts 23 adjustably secure channels 17 and clamps 16 in their proper position along the screw-threaded portion 20 of rod 19, and a lock washer 24 may be provided to prevent loosening.

This novel construction permits securing channels 17 and clamps 16 the correct distance apart to properly engage shield 14. It also performs the several functions with the least number of parts and permits quick and accurate assembling by one not necessarily skilled in the art.

The type of clamp 16 used is optional. It may be of any form which presents gripping members 25 and a means 26 for tightening and loosening the same. Members 25 may be provided with rubber surfaces, if desired, to preclude marring of window 15.

It is clear from the drawing and description that this device may be used on either side of a locomotive cab or reversed to be used when backing. It is also adapted for use on the windows and doors of mail and express cars, caboose windows and doors, and in fact, wherever a trainman is called upon to look in the direction which the train is traveling. The shield does not prevent the window or door from sliding, and may be left in place as long as desired. Its operation and novel features are obvious. It is desired not to be limited in its construction except as set forth in the appended claims.

What is claimed is:

1. In combination with a longitudinally slidable side window of a locomotive cab, a vision protecting shield extending at substantially right angles therefrom and means for removably maintaining said shield in the operative position.

2. In combination with a longitudinally slidable window of a vehicle, a vision protecting shield extending at right angles therefrom and rigidly mounted thereon for movement therewith.

3. In combination with a longitudinally slidable window of a vehicle, a vision protecting shield extending at right angles therefrom and mounted for vertical adjustment thereon and movement therewith.

4. In a protecting shield of the class described, a transparent member, a support therefor comprising a pair of channels adapted to grip said member and each having a lug integral with one wall thereof, a connecting member for said channels engaging the lug formed thereon and means for attaching said protecting shield rigidly carried by said connecting member comprising a clamp disposed beyond each end of said transparent member, each of said clamps having said connecting member passing therethrough and locking means carried by said member engaging each side of said clamp to adjustably retain the same in a predetermined spaced-apart relation.

In testimony whereof we hereunto affix our signatures this 27th day of February, 1925.

OSCAR H. REBENSCHIED.
CHARLES G. MEE.